United States Patent [19]

Hesse

[11] 4,331,201
[45] May 25, 1982

[54] CLAMPED CONNECTION

[75] Inventor: Wolfgang Hesse, Remseck, Fed. Rep. of Germany

[73] Assignee: Sueddeutsche Kuehlerfabrik Julius Fr. Behr GmbH & Co. KG, Stuttgart, Fed. Rep. of Germany

[21] Appl. No.: 98,839

[22] Filed: Nov. 30, 1979

[30] Foreign Application Priority Data

Dec. 4, 1978 [DE] Fed. Rep. of Germany ....... 2852408

[51] Int. Cl.³ .............................. F28F 9/12; F28F 9/14
[52] U.S. Cl. ..................................... 165/153; 403/284
[58] Field of Search ................. 403/274, 284; 165/72, 165/173, 152, 166, 167, 153; 285/364, 424

[56] References Cited

U.S. PATENT DOCUMENTS 3,583,478 6/1971 Fieni ..................................... 165/178
3,888,063 6/1975 Frantz ................................ 29/509 X
4,023,618 5/1977 Kun et al. ........................ 165/192 X Primary Examiner—Wayne L. Shedd Attorney, Agent, or Firm—Schwartz, Jeffery, Schwaab, Mack, Blumenthal & Koch

[57] ABSTRACT

Disclosed is a clamped connection for clamping together separate parts, comprising a first part having a flange; a second part having an edge and an edge region adjacent to the edge. The edge region is deformable from a first condition in which the edge region is continuous and straight or has a constant radius of curvature along most of its length and a second condition in which the edge region has a continuously corrugated configuration including alternately deformed and undeformed partial edge region areas. The edge region includes a plurality of elongated apertures spaced from the edge and extending generally parallel thereto, and the deformed partial edge region areas are bounded on the side opposite to the edge by these apertures, whereas the undeformed partial edge region areas are located between said apertures. Also disclosed is a device for clamping together two parts to produce the disclosed connection.

4 Claims, 10 Drawing Figures

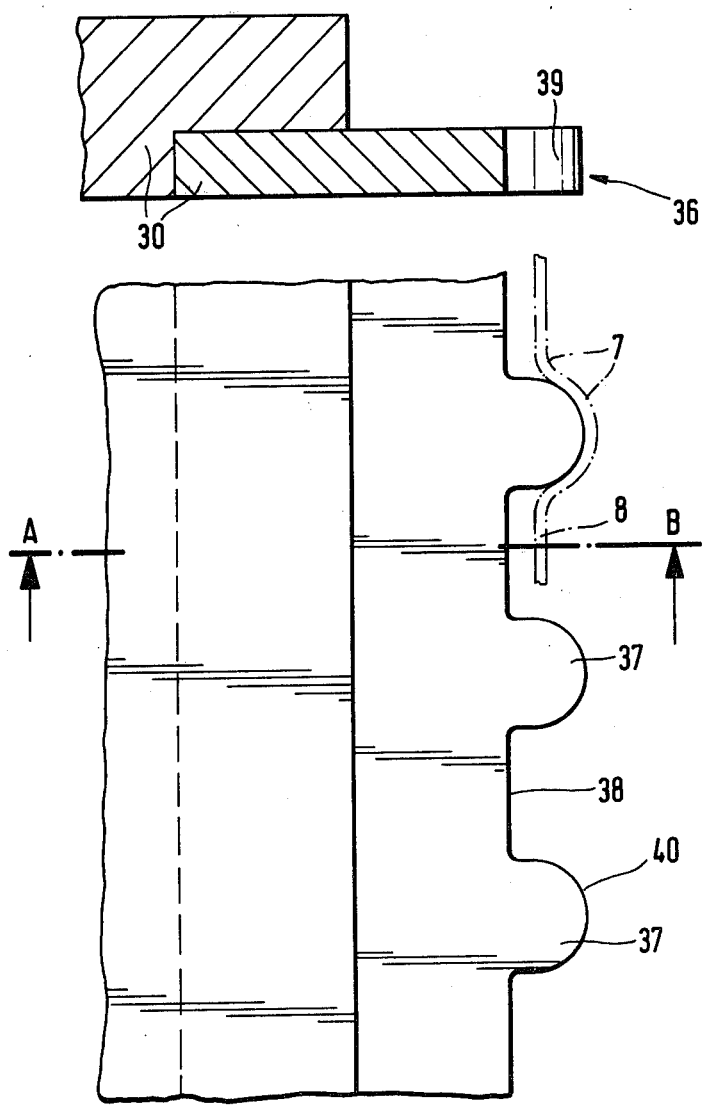

CLAMPED CONNECTION

BACKGROUND OF THE INVENTION

The present invention relates to a clamped connection and more especially to a clamped connection between two parts, one having a flanged portion and the other having an edge section designed to be deformed into positive locking contact with the flanged portion.

Different connections of the above-mentioned type, so-called flanged joints, are known wherein the deformable edge section of the bottom positively grips the flange (e.g., French Pat. No. 1,039,911; German Gebrauchsmuster No. 74 14 340), but such connections are not highly suitable for repair purposes because, while they are releasable, they cannot be subsequently refastened. On the other hand, releasable connections are also known, for example, the slotted joint for a water cooler according to German Offenlegungsschrift No. 27 03 528. In this disclosure, the flange of the water box has locking elements with spring action, and the enveloped tube plate has corresponding recesses to receive the engagement of the locking members. Such a joint, however, involves, on the one hand, a relatively complex flange area and, on the other hand, a less than favorable state of stress of the flange, because of the interrupted, diminished cross section and as the result of bending forces.

Finally, U.S. Pat. No. 3,399,916 discloses a snap connection for structural elements, wherein springingly designed bulges of one of the structural elements lock into corresponding recesses of the other element, when the elements are joined together. This snap or locking connection, however, does not provide a tight connection with the use of a deformable packing and is thus not of the same type as the connection according to the invention. Furthermore, such locking connections, because of their elastic deformation as opposed to a plastic deformation, provided only a relatively weak positive joint, i.e., a slight amount of overlap of the two parts, which results in a low degree of safety for the joint.

SUMMARY OF THE INVENTION

It is therefore an object of the present invention to provide an improved clamping connection.

It is a further object of the invention to provide a simple clamping connection which, one the one hand, results in a safe and durable sealing of the parts to be connected, uses a reduced amount of material and is simple to produce and, on the other hand, may be released for the purpose of effecting repairs.

In particular, it is the object of the invention to insure that the connection to be established may be produced in a simple manner and be releasable even in the case of inaccessible parts which are joined together.

Another object of the invention resides in the provision of a device for producing the clamping connection according to the foregoing objects.

It is also an object of the invention to provide an improved heat exchanger embodying the clamped connection according to the invention.

In accomplishing the foregoing objects, there has been provided in accordance with the present invention a clamped connection for clamping together separate parts, the connection comprising a first part having a flange; a second part having an edge and an edge region adjacent to the edge. The edge region is deformable from a first condition in which the edge region is continuous and straight or has a constant radius of curvature along most of its length and a second condition in which the edge region has a continuously corrugated configuration including alternately deformed and undeformed partial edge region areas. The edge region includes a plurality of elongated apertures spaced from the edge and extending generally parallel thereto, and the deformed partial edge region areas are bounded on the side opposite to the edge by these apertures, whereas the undeformed partial edge region areas are located between said apertures. The flange and edge region have an unclamped condition in which the deformable edge region is in its first condition and a clamped condition in which the deformable edge is in its second condition, with the deformed partial edge region areas positively and lockingly engaging the flange when the flange and edge region are in the locked condition to form a positive joint. The edge also includes means for stiffening the clamping connection in the clamped condition, these stiffening means comprising the undeformed partial areas. Typically, the connection further comprises an elastic packing member positioned between the first and second parts.

In accordance with another aspect of the invention, there has been provided a device for establishing the aforesaid clamping connection between prefitted first and second parts. The device comprises a lower part with a receiving jaw to accept the first and second prefitted parts to be joined; an upper part; means for opening and closing the upper part with respect to the lower part; means, responsive to closing of the upper and lower parts for deforming the edge region of the second part into a continuously corrugated configuration including alternately deformed and undeformed partial areas, wherein the deformed partial areas positively and lockingly engage the flange. The deforming means is mounted on the lower part for movement transverse to the closing direction and includes deforming sections and recesses in alternating succession.

According to yet another aspect of the invention, there has been provided a heat exchanger, comprising a water box, a sheet metal bottom plate holding a plurality of tubes and a clamped connection between the water box and the bottom plate, with the clamped connection being that according to the present invention.

Further objects, features and advantages of the present invention will become readily apparent to the skilled artisan from the detailed description of preferred embodiments which follows, when considered together with the attached figures of drawing.

BRIEF DESCRIPTION OF THE DRAWINGS

In the drawings:

FIG. 8 is a detailed cross-sectional view of the closing jaw of the device of FIG. 7;

FIG. 9 is a top view of the closing jaw of the invention; and

DETAILED DESCRIPTION OF PREFERRED EMBODIMENTS

Initially, the characteristic of the continuous outer edge of the edge region yields the advantage that the usual process step of notching the edge region to obtain a number of flaps is eliminated. The alternating arrangement of deformed and undeformed partial areas provides a solid and durable connection, insuring the necessary tightness of both parts. The deformation of the edge region into corrugated segments results in work hardening, due to the straining of the material, thus contributing to the fatigue strength of the joint. According to one embodiment of the invention, the deformable edge region of the bottom plate is provided with a continuous edge, so that on the flange of the water box, i.e, the first part, a corrugated strip is obtained, which is directed essentially perpendicularly to the upper limiting surface of the flange. This lends high rigidity to such water box-bottom plate connections. In particular, the areas of the bottom plate standing perpendicularly against the upper limiting area of the flange provide an increased section modulus, which is highly advantageous in view of the connection which is stressed by bending.

Another advantageous embodiment of the invention comprises a device for the production of the clamping connection according to the invention. It is thereby possible in a simple manner to establish the connection of the invention in a simple process step and with a tool of simple design. The fact that the deforming tool urges the deformable edge sections in the horizontal direction over the flange, which is pressed downwardly, yields the advantage that this locking process may be used even for water boxes, in connection with which there are parts projecting outwardly, such as, for example, connecting fittings, which do not permit the locking of the water box by a movement from above in the downward direction.

Figure 1:
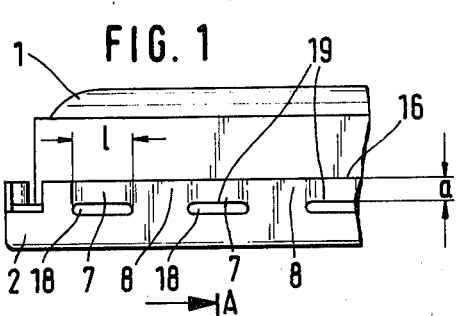
FIG. 1 is a front elevation view of the connection according to the invention.
Figure 2:
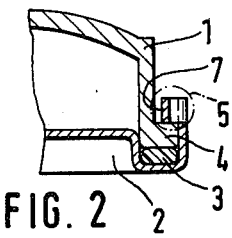
FIG. 2 is a cross-sectional view of the connection according to the invention.
Figure 3:
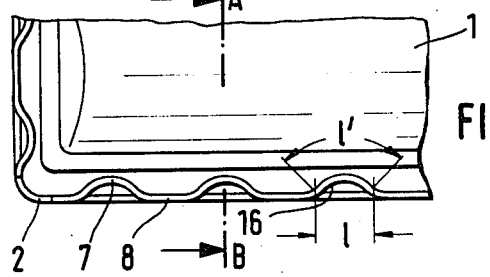
FIG. 3 is a top view of the connection according to the invention.

Referring now to the drawings, FIGS. 1, 2 and 3 show the clamping connection according to the invention in the finished, i.e., the closed state, in an application to a heat exchanger wherein the water box 1, representing the first part, and the tube plate 2, representing the second part, are connected with each other, and a packing is inserted in a fluid and pressure tight manner. Both thus form the collector vessel of a heat exchanger, shown only in part, which comprises in the known manner two collector vessels of this type and flanged tubes joining the collector vessels, with a hot, pressurized medium flowing through them.

FIG. 1 shows that, underneath the outer edge 16, appearing here as a straight line, of the bottom plate 2, elongated holes 18 are arranged at a distance a from the outer edge 16. Above these elongated holes 18 having a length l, i.e., between their longitudinal sides 19 and the corresponding arcuate shaped segments 1' of the outer edge 16, there are found the deformed partial areas 7 which appear in FIG. 3 as corrugated bulges pointing inwardly, in the direction of the water box. FIG. 2 shows a section through such a bulge, i.e., a deformed partial area 7, and illustrates the fact that there the sheet metal of the bottom plate 2 is perpendicular to the flange 4 of the water box 1. This results in a relatively high section modulus for the edge section 5, which is under bending stress by the packing and internal forces. Between the elongated holes 18 are found the undeformed partial areas 8 which again remain standing as the vertical strips of the bottom plate 2. To this extent, the partial areas 7 and 8, located together in vertical planes are constantly passing into each other, thus forming the corrugated configuration of the outer edge 16, seen in FIG. 3. The deformed partial areas 7 may also stand in an inclined position with respect to the flange 4, when the lower part of the bulge is pressed further over the flange than the upper part.

Figure 4:
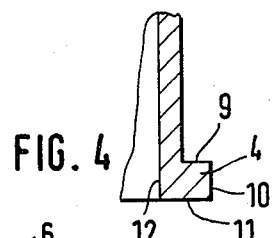
FIG. 4 is an isolated cross-sectional view of the flange of the first part to be connected according to the invention.

FIG. 4 shows in detail the flange 4 of the water box 1 in cross section, wherein the latter has a rectangular configuration. The flange 4 is here bounded by the upper limiting surface 9, the lateral surface 10, the lower surface 11 resting upon the packing and the inner surface 12. All four of these surfaces are continuous, i.e., not interrupted perpendicularly to the plane of the drawing, so that the cross section of the flange 4 remains constant. In other words, the flange is continuous and uninterrupted along a plane parallel to its length and has a substantially constant cross section in a plane perpendicular to its length.

Figure 5:
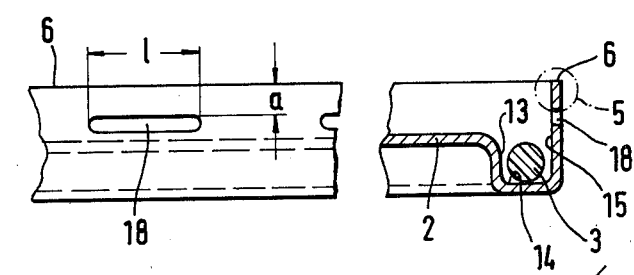
FIG. 5 is a view, partly in section, of the deformable edge section of the second part of the connection and the packing prior to deformation.
Figure 6:
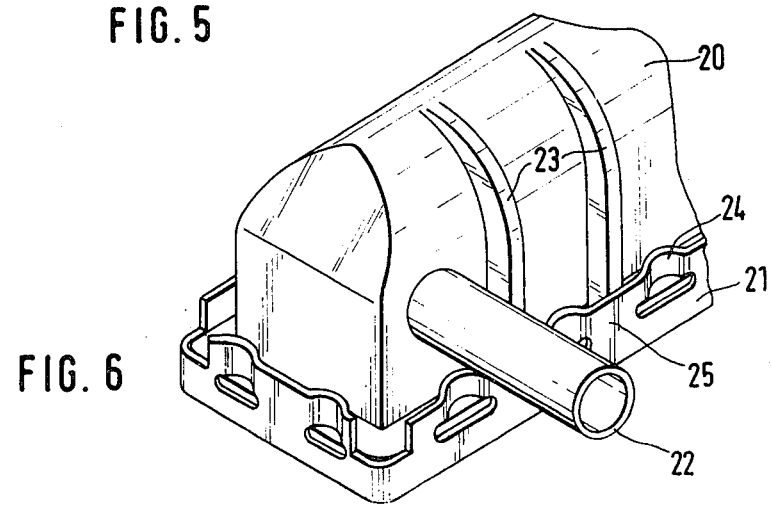
FIG. 6 is a perspective view of the connection according to the invention used in a vehicle radiator.

FIG. 5 shows the outer area of the tube plate 2 prior to the establishment of the connection according to the invention, i.e., prior to the deformation of the deformable edge section 5. This outer section of the bottom plate 2 has the configuration of a rectangular groove, corresponding with the flange shape 3 described in FIG. 4. It comprises the inner surface 13, the lower surface 14 to receive the packing 3, and the outer surface 15. The outermost area of the bottom plate 2 terminates in the edge section 5 standing vertically upward prior to the deformation, this edge section being limited on the outside by the continuous, straight line outer edge 6. It may also be seen in this representation that the partial areas to be deformed and the partial areas 8 which are not to be deformed, prior to the deformation, are in a common plane, or in parallel planes, respectively. It is seen from this comparative display of FIGS. 1 to 3 and FIG. 5 that the edge section 5 within the area of the deformed partial segments 7 has been strained after the deformation, because the length of the arcs 1' in FIG. 3 is greater than the corresponding previous straight line distance 1. This results in a work hardening of the deformed material and thus an increase in the stiffness and mechanical strength of the entire joint.

FIG. 9 shows the connection according to the invention as applied to the radiator of a motor vehicle. The water box 20 of the device is made of a synthetic plastic material and has at its outer wall reinforcing ribs 23, which terminate with their outer limiting surfaces flush with the flange. To this extent, the tube plate 21 associated with the water box 20 cannot be deformed in these areas of the ribs. The connection according to the invention and the process for its manufacture, to be described hereinbelow, are found to be advantageous here, because the deformed partial areas 24 and the undeformed partial areas 25 may be designed in keeping with the geometry of the water box at the tube plate 21. Furthermore, the connection according to the invention is again highly advantageous when a water box of this type is equipped with a pipe fitting or the like, extending beyond the configuration of the water box itself. Because the deformed partial areas 24 are inserted in the horizontal direction, the joint of the invention may be established even in the case of such relatively inaccessible water boxes 20.

Figure 7:
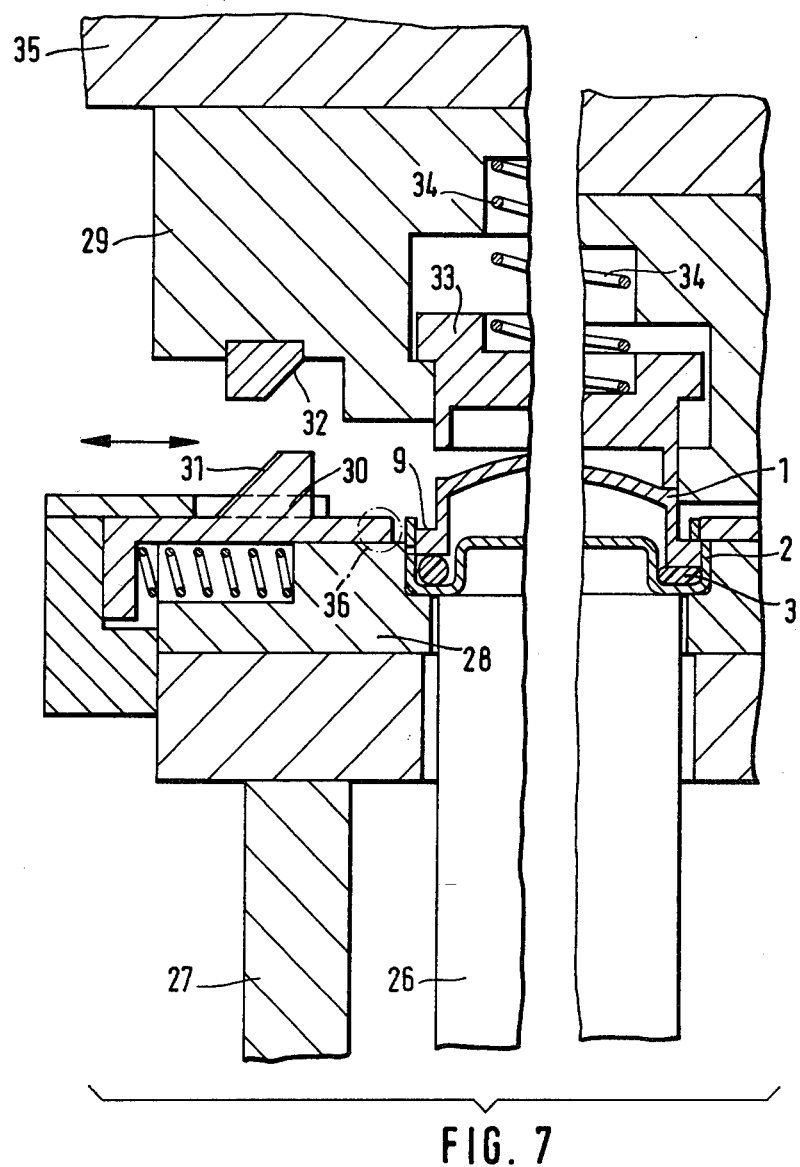
FIG. 7 illustrates schematically, in split representation, the closing device to establish the connection of the invention.

In FIG. 7 a device for the establishment of the clamped connection according to the invention is represented in two semisections, wherein the left side of the figure shows the device in the open condition and the right side shows it in the closed condition. The device according to the invention consists essentially of a stationary lower part of the tool 27 having receiving jaws 28 which accept the heat exchanger 26 with the parts to be joined, i.e., the water box 1 and the tube plate 2. The upper part 29 of the tool is movable in the vertical direction and is actuated by a press 35. It comprises within its area above the water box 1 a hold-down element 33 supported against the tool by a compression spring 34. On each of the receiving jaws 28 is arranged a closing jaw 30 according to the invention, said closing jaw being guided movingly and in the horizontal direction, i.e., transversely to the closing motion of the upper part 29 of the tool, in suitable slide rails. In order to produce this horizontal sliding motion, the closing jaw 30 is provided with wedge surface 31 corresponding to a cooperating slide surface 32 on the upper part 29 of the tool. During the downward motion of the upper part 29 of the tool, the two wedge surfaces 31 and 32 slide upon each other so that the closing jaw 30 performs a horizontal straight line movement in the direction of the water box 1. Prior to that, the water box has been pressed downwardly during the downward movement of the upper part 29 of the tool until the upper edge of the flange comes to rest lightly underneath the lower edge of the closing jaw 30. This opens a path for the horizontal inward movement of the closing jaw 30, which then urges the partial areas of the bottom plate 2 to be deformed over the upper horizontal limiting surface 9 of the flange, by means of the specifically designed deforming area 36 of the closing jaw.

In FIGS. 8 and 9, the closing jaw 30 of the invention is represented in more detail. It is characterized by the deforming area 36 which is designed to deform the edge section 5 of the bottom plate 2, whereby the edge section 5 has deforming areas 37 and recesses 38 arranged between the deforming sections 37. The deforming sections 37 display an approximately sinusoidal corrugated deforming surface 39 extending preferably perpendicularly to the horizontal movement of the closing jaw 30, but which may also be inclined to this horizontal motion. This results in the sinusoidal configuration 40 of the deformation area 36, seen in FIG. 9. The approximately sinusoidal curvature of the deformation surfaces 39 leads to an approximately uniform strain of the material of the deformed partial areas 7. Because of the presence of the recesses 38, in these areas the edge section 5 of the bottom plate 2 is not involved in the horizontal closing motion of the closing jaw 30, so that the undeformed partial areas 8 remain in their unchanged position.

Figure 10:
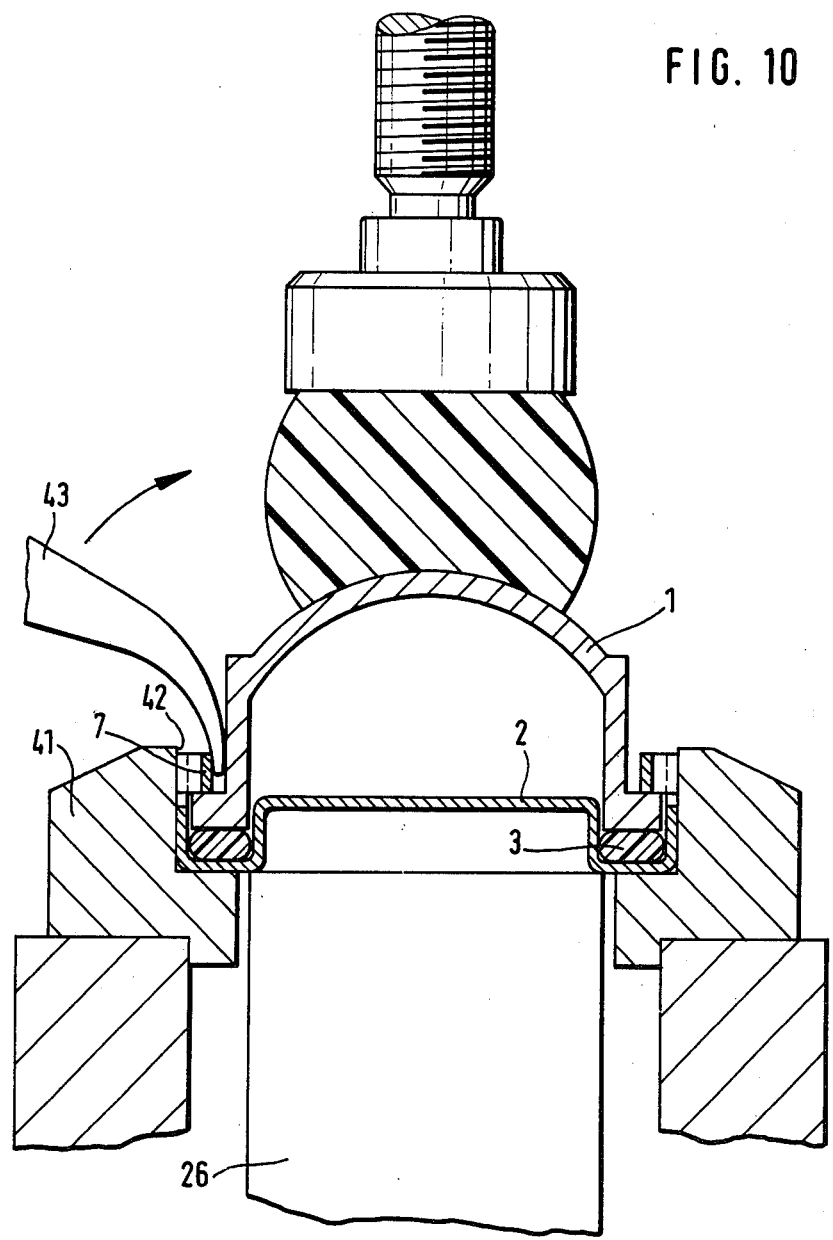
FIG. 10 is a view, partly in section, illustrating schematically a device for opening the connection according to the invention.

Finally, FIG. 10 shows one embodiment of a device for opening the connection according to the invention, for example, for repair purposes. For this purpose, the heat exchanger 26 to be repaired is inserted in the corresponding recesses of the opening jaw 41 of the device and is clamped therein. To open the clamping connection of the invention, a lever 43 having the configuration of a hook in its terminal section is applied between the water box 1 and the deformed partial areas 7 of the bottom plate 2 and is rotated upwardly in the direction of the arrow. The deformed partial areas 7 are thereby pushed back outwardly over the flange of the water box 1 against the stop edge 42 of the opening jaw 41. This opens the clamping connection and the water box may be lifted from the bottom plate 2. Following the completion of the repairs, the parts of the water box 1 and the bottom plate 2, with the packing 3 inserted between, may be rejoined as described hereinabove and durably locked in position.

What is claimed is:

1. A clamped connection for clamping a water box to a bottom plate which is adapted to support a bundle of tubes for a heat exchanger, the connection comprising:
   (a) a flange on said water box, said flange being continuous and uninterrupted along a plane parallel to its length, said flange having a substantially constant cross section in a plane perpendicular to its length;
   (b) an edge on said bottom plate and an edge region on said bottom plate adjacent said edge, said edge region being deformable from a first condition in which said edge region is continuous and straight or has a constant radius of curvature along most of its length and a second condition in which said edge region has a continuously corrugated configuration including alternately deformed and undeformed partial edge region areas, said edge region including a plurality of elongated apertures spaced from said edge and extending generally parallel to said edge, said apertures being present in said edge region when said edge region is in its first undeformed condition as well as when it is in its second deformed condition, said deformed partial edge region areas being bounded on the side opposite to said edge by said apertures and said undeformed partial edge region areas being located between said apertures;
   (c) said flange and edge region having an unclamped condition in which said deformable edge region is in its first condition and a clamped condition in which said deformable edge is in its second condition;
   (d) said deformed partial edge region areas positively and lockingly engaging said flange when said flange and edge region are in the locked condition to form a positive joint;
   (e) said edge including means for stiffening the clamping connection in the clamped condition, said stiffening means comprising said undeformed partial areas, and
   (f) an elastic packing member positioned between said water box and bottom plate.

2. A clamped connection according to claim 1, wherein said flange comprises an approximately rectangular cross section and said bottom plate comprises a rectangular groove for receiving the flange and a packing member, and wherein said edge region extends approximately perpendicular to the surface of said flange which faces away from said bottom plate.

3. A clamped connection according to claim 1 wherein said water box is of a synthetic resinous material and said bottom plate is of a sheet metal.

4. A heat exchanger, comprising a water box, a sheet metal bottom plate holding a plurality of tubes and a clamped connection between said water box and said bottom plate, said clamped connection being a clamped connection as defined by claim 1.

* * * * *